United States Patent
Kocher, II

(10) Patent No.: US 7,273,132 B2
(45) Date of Patent: Sep. 25, 2007

(54) METHOD AND APPARATUS FOR LUBRICATING BEARINGS ON A VERTICAL SHAFT IN A GEARBOX

(75) Inventor: Orville C. Kocher, II, West Bend, WI (US)

(73) Assignee: Weasler Engineering, Inc., West Bend, WI (US)

( * ) Notice: Subject to any disclaimer, the term of this patent is extended or adjusted under 35 U.S.C. 154(b) by 559 days.

(21) Appl. No.: 10/685,779

(22) Filed: Oct. 15, 2003

(65) Prior Publication Data
US 2005/0082120 A1    Apr. 21, 2005

(51) Int. Cl.
*F01M 11/02*    (2006.01)
(52) U.S. Cl. ..................................... 184/6.12
(58) Field of Classification Search .............. 74/606 R, 74/467; 184/11.2, 6.18
See application file for complete search history.

(56) References Cited

U.S. PATENT DOCUMENTS

| | | | |
|---|---|---|---|
| 1,000,049 A | 8/1911 | Symons | |
| 2,349,131 A | 5/1944 | Anderson | |
| 2,654,441 A * | 10/1953 | Palmer et al. | 184/11.1 |
| 2,719,667 A | 10/1955 | Kaczor | |
| 3,647,024 A * | 3/1972 | Wick et al. | 184/6.18 |
| 4,677,871 A * | 7/1987 | Taniyama et al. | 74/467 |
| 5,779,005 A | 7/1998 | Jones, Jr. et al. | |
| 5,816,116 A | 10/1998 | Antony et al. | |
| 5,887,678 A | 3/1999 | Lavender | |
| 5,980,222 A | 11/1999 | Fry | |
| 6,032,550 A | 3/2000 | Rugh | |
| 6,267,204 B1 | 7/2001 | Kristensen et al. | |

* cited by examiner

*Primary Examiner*—Vicky A. Johnson
(74) *Attorney, Agent, or Firm*—Quarles & Brady

(57) ABSTRACT

A right angle gear box includes a plurality of channels for carrying lubricating fluids to one or more upper bearing. Fluids in the gear box are naturally pumped through the channels by the rotation of gears in the gear box. The area between the shaft and the external housing is minimized to minimize fluid flow along the shaft encouraging flow through the channels instead. Lubrication of an upper bearing is therefore provided without the need for additional pumps, seals, or lubricants.

17 Claims, 2 Drawing Sheets

METHOD AND APPARATUS FOR LUBRICATING BEARINGS ON A VERTICAL SHAFT IN A GEARBOX

BACKGROUND OF THE INVENTION

The present invention relates generally to lubricating gears and bearings in gearboxes and, more particularly, to a right angle gearbox with improved lubrication characteristics.

Right angle or T-style gearboxes, which have input and output shafts that are perpendicular to each other, are widely used in industrial drive applications. These types of gearboxes can be operated in both a horizontal (with both shafts positioned horizontally) and a vertical (with one shaft positioned horizontally and the other vertically) configuration. Typically, the shafts are coupled to bearings, and oil or lubricants are provided in the gearbox to lubricate both the gears and the bearings. When used in a horizontal configuration, the input and output shafts are in substantially the same plane, and lubricants provided adjacent the gear can be easily spread or "splashed" onto the bearings and along the shaft as the gear rotates to lubricate the bearings and prevent overheating and premature wear.

When the gearbox is operated vertically, however, the bearings are offset vertically from the gears and lubricants provided in the gearbox. One or more bearings, therefore, is offset at a height well above the first bearing and associated gears. Gravity, therefore, prevents lubricants in the gearbox from being splashed or splattered onto the bearing to lubricate the upper bearing. Typically, to provide sufficient lubrication, an oil seal is provided below the upper bearing or between the first and second bearings, and a resultant void is filled with grease. Alternatively, a grease fitting can be provided in the housing.

While providing sufficient lubrication, traditional methods of retrofitting a gearbox for operation in the vertical position are time consuming, messy, and expensive. There remains a need, therefore, for a right angle gearbox which can be operated in a vertical position while providing sufficient lubrication to all of the gears and bearings.

BRIEF SUMMARY OF THE INVENTION

In one aspect, the invention is a gearbox comprising a sealed housing for receiving a lubricant. A rotational shaft is provided in the housing, and is coupled to a gear drive which rotates the shaft. A bearing is further coupled to the first rotational shaft at a distance from the gear drive. At least one channel is provided in the housing, extending parallel to the length of the rotational shaft and extending to the bearing. A bottom of the channel is positioned adjacent the gear drive, and receives lubricating fluid rotated by the gear drive such that, as the gear rotates, fluids adjacent the gear are rotated due to friction characteristics of the fluid. The rotating lubricants pass into the channel and are carried by momentum to the bearing to lubricate the bearing. To improve the flow of fluids into the channel, a recess having a larger diameter than the channel is preferably provided at the bottom end of the channel to capture rotating fluids.

The distance between the rotational shaft and the housing is preferably minimized to restrict the flow of fluid in the area between the housing and the rotational shaft and therefore to encourage circulation of fluids through the channel. A shoulder can be provided, for example, extending radially inward from an internal diameter of the housing. The internal diameter of the shoulder is selected such that the area between the shoulder and the shaft is restricted to the flow of fluid by viscosity of the lubricant, causing lubricants to instead flow through the channel.

The rotational shaft can be vertical in use. Furthermore, the gearbox can be provided as a right angle gearbox, comprising a right angle rotational shaft provided in the housing at a substantially right angle to the rotational shaft, and coupled to the rotational shaft through the gear drive.

The channels can be arranged so that fluids are directed to the upper bearing due to the fluid pressure on the lower side caused by the swirling fluid in the gear case. The fluid pressure on the lower side results in a pressure differential, with higher pressure on the lower side than the upper side. This differential results in fluid flow up to the upper bearing.

To sufficiently lubricate the bearing or bearings, the gearbox preferably comprises a plurality of channels for carrying lubricating fluids. In one embodiment, four channels are spaced around a circumference of the housing surrounding the rotational shaft. The channels can be provided in a split case construction in which each half of the case, for example, includes one full channel and two half channels.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
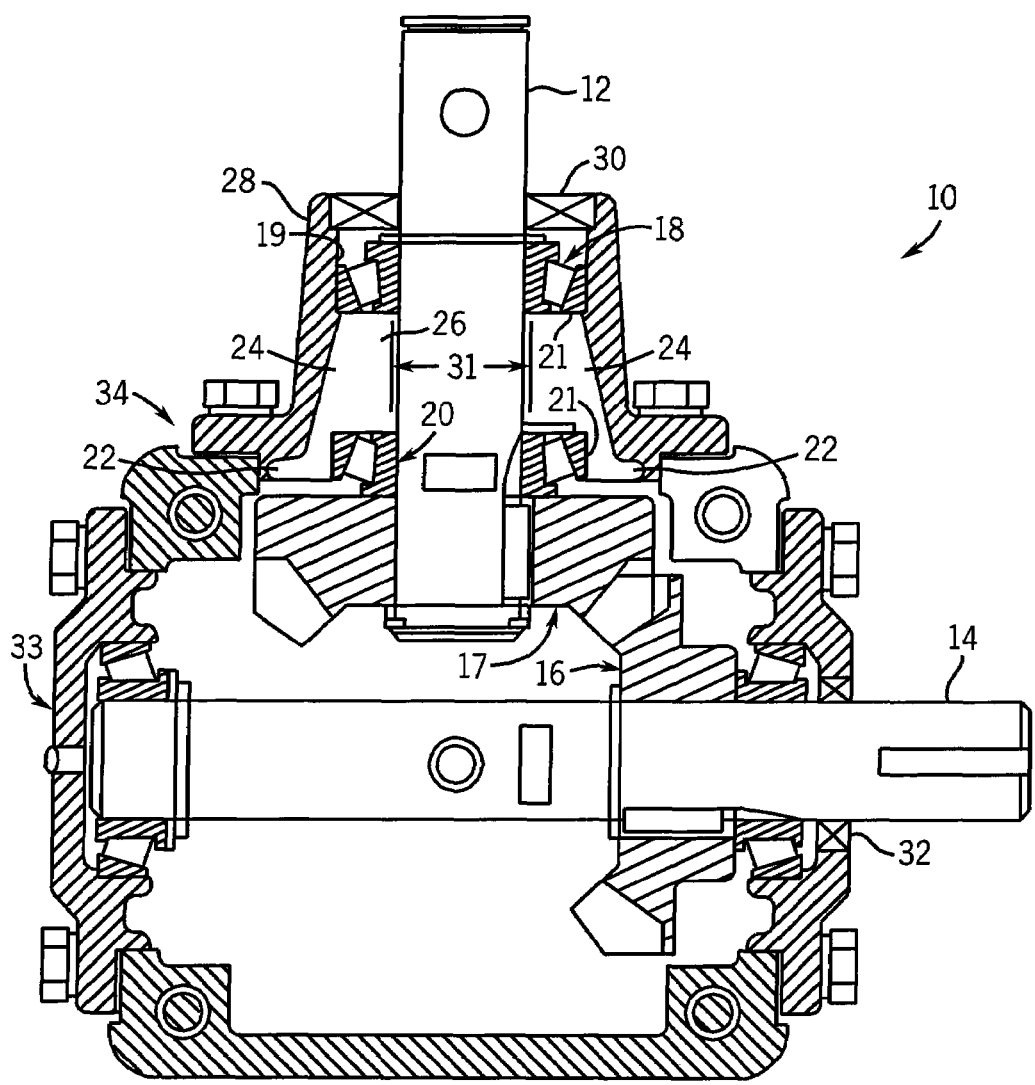
FIG. 1 is a cross-sectional view of a gearbox constructed in accordance with the present invention, as viewed from the plane of both shaft axes.

Referring now to the Figures and more particularly to FIG. 1, a right angle gearbox 10 constructed in accordance with the present invention is shown. The gearbox 10 comprises a housing 34 containing a first shaft 12 and a second shaft 14. A central axis of the first shaft 12 is provided at an angle substantially perpendicular to a central axis of the second shaft 14. The angle between the two shafts could be any angle. First and second gears 16 and 17 couple the second shaft 14 to the first shaft 12, wherein as the first shaft 12 is rotated, motion is translated to the second shaft 14 or vice versa. The housing 34 encloses the shafts 12 and 14 and associated gears, and can be constructed of a plurality of housing components including, at least, a lower housing component 33 for housing the shaft 14 and an upper housing or quill 28 for housing the shaft 12. The shaft 12 is provided through the housing or quill 28 and extends through a first (lower) bearing 20 and second (upper) bearing 18 in the quill 28, the bearing 20 being received in bearing seat 23 below shoulder 26 and the bearing 18 being received in bearing seat 19 above shoulder 26. A first seal 30 is provided between the input shaft 12 and the quill 28, while a second seal 32 is provided between the output shaft 14 and an associated housing 33. The seals 30 and 32 enclose the housing 34 of the gearbox 10 such that lubricating fluids such as oils or other lubricants can be provided in the gearbox to lubricate the shafts 12 and 14, gears 16 and 17, and bearings 18 and 20. The bearings 18 and 20 can be any of a number of different types of bearings, including tapered roller bearings as illustrated in FIG. 1 having an outer race 21, as shown without the other bearing components in FIG. 3.

Figure 2:
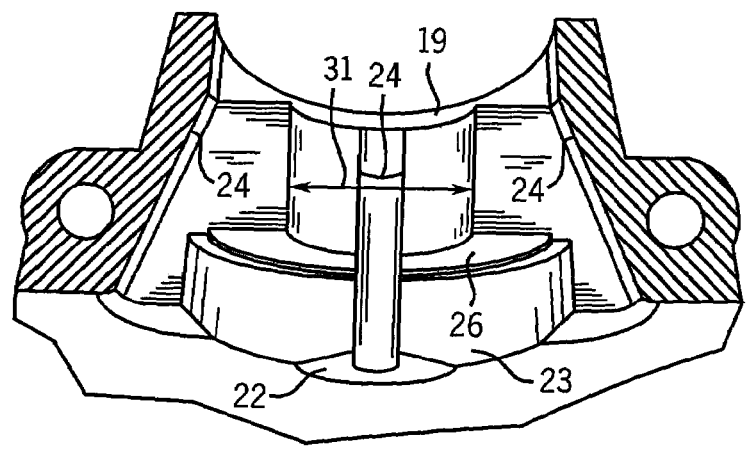
FIG. 2 is a fragmentary cross-sectional perspective view of one half of a split case version of the upper portion of the housing of FIG. 1 illustrating channels for carrying lubricants to an upper bearing, looking up from below it.
Figure 3:
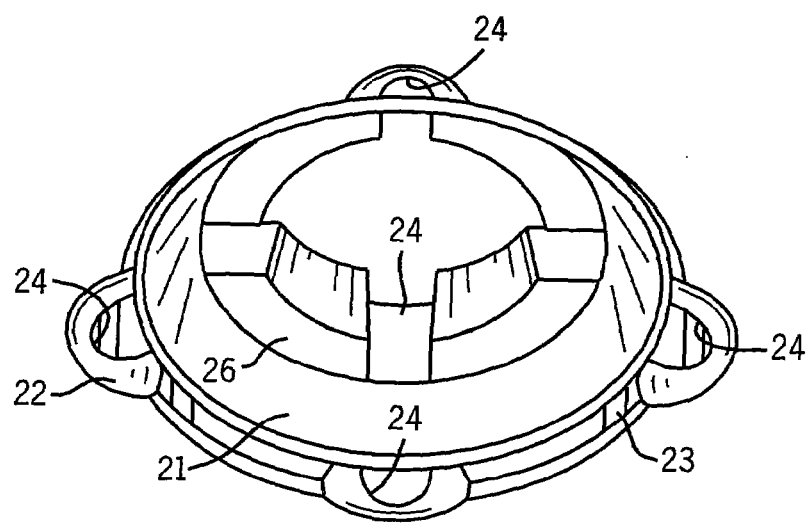
FIG. 3 is a fragmentary perspective view looking up at the bottom of the upper portion of the housing of FIG. 1 as partially assembled.

Referring now to FIGS. 1, 2, and 3, the quill 28 is preferably a cylindrical tubular housing sized to receive the input shaft 12. The quill 28 includes a shoulder 26 which extends radially inward for a portion of the quill 28 centered about the approximate vertical center of the quill 28. The shoulder 26 extends radially inward toward the horizontal center of the quill 28 to provide an inside diameter 31 which is slightly larger than the outside diameter of the shaft 12. The inside diameter of the shoulder 26 is selected to allow clearance for the shaft 12, but is small enough to be sealed to the shaft by the viscosity of lubricating fluids introduced into the gear box 10 as described below. The bearings 20 and 18 are positioned on opposing sides of the shoulder 26, with the bearing 18 retained in seat 19 above a top edge of the shoulder 26 and the bearing 20 retained in seat 23 below a bottom edge of the shoulder 26. The shoulder 26 provides extra axial support for the bearings 20 and 18 for when a thrust load is applied to the shaft 12.

Referring still to FIGS. 1, 2, and 3, a plurality of grooves or channels 24 are also provided in the internal side walls of the quill 28, through the shoulder 26. As shown in FIG. 3, four channels 24 are spaced equidistantly (90° apart) around the circumference of the quill 28. Any number of channels could be provided, equally spaced or not. The channels 24 each extend from a bottom section of the quill 28 adjacent the gear 17 and bearing 20 to a point above the top edge of the shoulder 26, and therefore adjacent a bottom side of the upper bearing 18. The channels 24 therefore extend between each of the first and second bearings 18 and 20. At the end adjacent the gear 17, each of the channels 24 widens into a recess 22 which opens in the direction of the rotating gear 17. The recesses 22 provide an enlarged area at the bottom of the channels 24 for capturing lubricating fluids swirling in the gearbox 10, as described below.

The quill 28 can be provided as a single unitary piece, as shown in FIG. 3, or as a "split case" housing including both a first and a second half. Each half includes both a full channel 24 and one half of two additional channels 24 As shown in FIG. 2, the full channel 24 is provided centered at the back of the split case and half of a channel 24 is formed in each of the sides. The opposing half (not shown) is a mirror image of the half shown in FIG. 2. The two split case halves are cast separately, and coupled together with, for example, threaded or other fasteners provided through apertures 25 and 27 in each half of the split case.

In operation, oil or other lubricating fluids are provided in the gearbox 10 to lubricate the gears 16 and 17, input shafts 12 and 14, and bearings 18 and 20. As the gears 16 and 17 rotate, the lubricating fluids next to the gear are rotated due to the friction characteristic of the fluid provided inside the gearbox 10, therefore causing the fluids to rotate or swirl. The swirling lubricating fluids are caught in the recesses 22 and the swirling motion causes a pressure differential, with higher pressure on a lower side and lower pressure on an upper side, such that the lubricating fluids are naturally circulated through the channels 24, past the bearing 18 to the upper bearing 20 and back. The distance between the shoulder 26 and shaft 12 is selected such that the viscosity of the lubricating fluid restricts the opening between the shaft 12 and the shoulder 26 of the quill 28, thereby providing a resistance to the flow of fluid back down into the gear case along the shaft and permitting a circulation of fluid through the channel 24. As a result of the rotating motion of the gears 16 and 17, both the lower bearing 20 and the upper bearing 18 can be easily lubricated without requiring any additional lubricating fluids, grease, seals, or pumps. Furthermore, when operated horizontally, lubricating fluids move easily through the channels 24 to lubricate the bearings 18 and 20.

Although the present invention has been described with reference to a right angle gear box, it will be apparent that the principles described can also be applied to other applications including a vertical shaft. Furthermore, although a specific housing has been described, variations in the construction of the housing will also be known.

Additionally, although a construction including two bearings spaced along the rotating shaft has been shown, it will be apparent that one or any number of bearings could be provided.

It should be understood that the methods and apparatuses described above are only exemplary and do not limit the scope of the invention, and that various modifications could be make by those skilled in the art that would fall under the scope of the invention. To apprise the public of the scope of this invention, the following claims are made:

The invention claimed is:

1. A gearbox, comprising:
   a sealed housing for receiving a lubricant;
   a first rotational shaft extending through a shoulder of the housing;
   a gear coupled to the rotational shaft below the shoulder to rotate the shaft;
   a first bearing journaling the first rotational shaft at a distance above the gear drive; and
   at least one channel opening radially to and along a length of the shaft, the channel provided in the shoulder and extending to the bearing, a lower portion of the channel being positioned above and adjacent the shoulder to receive lubricating fluid rotated by the gear;
   wherein, as the gear rotates, rotating lubricants pass into the channel and are propelled to the first bearing for lubrication of the first bearing.

2. The gearbox as defined in claim 1, further comprising a recess provided at the bottom end of the channel, the recess being enlarged relative to the channel to capture rotating fluids.

3. The gearbox as defined in claim 1, wherein the channel extends from an upper end of the gear to a lower end of the first bearing.

4. The gearbox as defined in claim 1, wherein the distance between an inner diameter of the shoulder and an outer diameter of the rotational shaft is selected to be sufficiently small that the viscosity of the lubricant restricts the opening between the inner diameter of the shoulder and the outer diameter of the rotational shaft to provide a resistance to the flow of fluid.

5. The gearbox as defined in claim 1, further comprising a second bearing positioned on the first rotational shaft nearer the gear than the first bearing, the channel extending past the second bearing to the first bearing and opening radially to the second bearing.

6. The gearbox as defined in claim 1, further comprising a second rotational shaft provided in the housing, the second rotational shaft being positioned at an angle to the first rotational shaft and coupled to the rotational shaft through the gear.

7. The gearbox as defined in claim 1, wherein the gearbox comprises a plurality of channels, each of the channels being spaced substantially equidistantly around a circumference of the housing surrounding the first rotational shaft.

8. The gearbox as defined in claim 6, wherein the housing comprises an upper section and a lower section, the upper section enclosing the first rotational shaft and the lower section enclosing the second rotational shaft.

9. The gearbox as defined in claim 8, wherein the upper section is a split case comprising a first and a second half.

10. A gearbox, comprising:
a sealed housing;
a substantially vertical shaft extending through a shoulder of the housing;
an upper bearing and a lower bearing journaling the shaft;
a gear coupled to the shaft;
a lubricant provided in the housing for lubricating the gear;
a shoulder positioned between the upper and lower bearings and having an internal diameter selected such that the viscosity of the lubricant restricts an opening between the shoulder and the outer diameter of the shaft; and
at least one channel opening radially to and along a length of the shaft, the channel provided in the shoulder and extending axially from the gear drive past the lower bearing and the shoulder to the upper bearing;
wherein as the gear rotates, the rotation causes the lubricant to be propelled through the channel to lubricate the upper bearing.

11. The gearbox as defined in claim 10, further comprising a second shaft provided in the housing, the second shaft being positioned at an angle of substantially ninety degrees to the substantially vertical shaft.

12. The gearbox as defined in claim 10, further comprising a plurality of channels.

13. The gearbox as defined in claim 10, wherein a recess having a diameter greater than a diameter of the channel is provided at an end of the at least one channel adjacent the gear.

14. The gearbox as defined in claim 10, wherein the channel angles from a wide point adjacent the gear to a narrow point adjacent the upper bearing.

15. The gearbox as defined in claim 10, wherein the housing comprises an upper portion and a lower portion.

16. The gearbox as defined in claim 15, wherein the channel is provided in the upper portion.

17. The gearbox as defined in claim 16, further comprising a plurality of channels wherein the upper portion includes a first half and a second half, each of the first and second halves including at least one of the plurality of channels, a half of a second of the plurality of channels, and a half of a third of the plurality of channels.

\* \* \* \* \*